R. MISSO & B. J. WARNER.
Car-Coupling.

No. 164,753.

Patented June 22, 1875.

WITNESSES:

INVENTOR:
R. Misso and
B. J. Warner
BY
ATTORNEYS.

UNITED STATES PATENT OFFICE.

ROCCO MISSO AND BISHOP J. WARNER, OF MACON, MISSISSIPPI.

IMPROVEMENT IN CAR-COUPLINGS.

Specification forming part of Letters Patent No. 164,753, dated June 22, 1875; application filed May 22, 1875.

*To all whom it may concern:*

Figure 1:
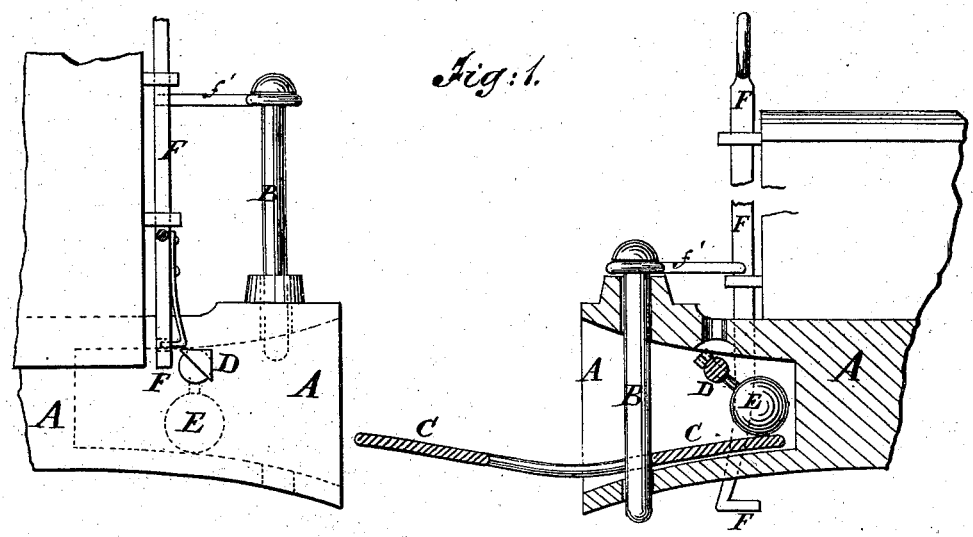
Figure 2:
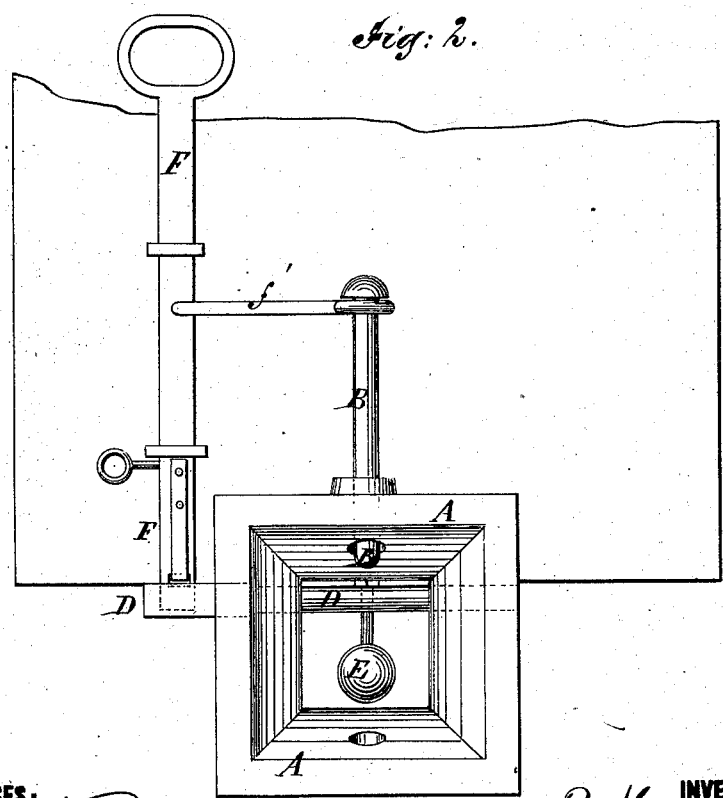
Figure 3:
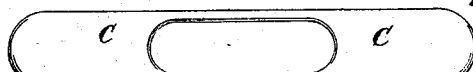

Be it known that we, ROCCO MISSO and BISHOP J. WARNER, of Macon, in the county of Noxubee and State of Mississippi, have invented a new and useful Improvement in Car-Coupling, of which the following is a specification:

Figure 1 is a side view of my improved car-coupling, partly in section, to show the construction. Fig. 2 is a front view of one part of the same. Fig. 3 is a top view of the coupling-link.

Similar letters of reference indicate corresponding parts.

The object of this invention is to furnish an improved car-coupling, which shall be so constructed that the cars may couple themselves as they are run together, and which shall be simple in construction and convenient in use.

The invention consists in the combination of the sliding bar, provided with a projecting arm, the rock-bar having its outer end halved or notched, and the ball, with the bumper-head and the coupling-pin of a car-coupling; and in the coupling-link having its end parts filled up, leaving a slot or cavity in its middle part, in combination with the ball, the rock-shaft, the sliding bar, the arm, the coupling-pin, and the bumper-head, as hereinafter fully described.

A represents the bumper-head, the cavity of which is made hopper-shaped, and which has a vertical hole through its forward part to receive the coupling-pin B. C is the coupling-link, the end parts of which are filled up, the central slot or cavity being made long enough to receive the two coupling-pins and allow the coupling to have sufficient play. D is a bar which passes horizontally through the bumper-head A, a little in the rear of the coupling-pin B and near the upper part of the cavity of said bumper-head.

To the bar D, within the cavity of the bumper-head A, is attached a ball, E. The ball E is made with a short stem which passes through a hole in the bar D, and has a screw-thread cut upon its end to receive the nut by which it is secured to said bar, so that by adjusting the said nut the said ball may be adjusted as may be required. The outer end of the bar D is notched or halved, as shown in Fig. 1, for the purpose hereinafter described. F is a bar or rod which slides up and down in keepers attached to the front of the car, and has its lower end bent forward and then to the rearward, as shown in Fig. 1, or it may have a forwardly-inclined spring having its lower end bent to the rearward, attached to its lower end, or a right-angled block or shoulder may be formed upon or attached to said lower end.

In case the spring is used its tension and the distance to which it projects may be regulated by a set-screw passing through the said bar or rod and resting against the said spring.

To the rod or bar F is attached or upon it is formed an arm, $f'$, which has a hole formed in its end to receive the coupling-pin B, so that the said coupling-pin may be raised by raising the said bar or rod F.

By this construction as the bar or rod F is raised it raises the coupling-pin B, and releases the coupling-link C, allowing the cars to be drawn apart. As the bar F is raised, and its end or shoulder passes above the bar D, the weight E turns the bar D, so that it passes beneath the end or shoulder of the bar F, and supports the said bar F, holding the coupling-pin B raised. If, now, a coupling-link, C, is pushed into the bumper A, either by hand or by an adjacent car, the end of the entering-link C strikes the ball E, and pushes it back, which turns the bar D, so that the bar F can drop through the notch or cut away part of the said bar D, allowing the coupling-pin B to drop through the cavity of the coupling-link C, coupling the cars.

Having thus described our invention, we claim as new and desire to secure by Letters Patent—

1. The combination of the sliding bar F, provided with an arm, $f'$, the rock-bar D, having its outer end notched, and the ball E, with the bumper-head A and the coupling-pin B, of a car-coupling, substantially as herein shown and described.

2. The coupling-link C, having its end parts filled up, leaving a slot or cavity in its middle part, in combination with the ball E, rock-shaft D, sliding bar F, arm $f'$, coupling-pin B, and bumper-head A, substantially as herein shown and described.

ROCCO MISSO.
BISHOP J. WARNER.

Witnesses:
COLUMBUS H. BRIDGES,
GEORGE F. FREEMAN.